United States Patent [19]

Stanwood

[11] 4,070,138
[45] Jan. 24, 1978

[54] SCREEN CHANGER APPARATUS

[75] Inventor: David A. Stanwood, West Covina, Calif.

[73] Assignee: Plastiflex Company, Inglewood, Calif.

[21] Appl. No.: 596,913

[22] Filed: July 17, 1975

[51] Int. Cl.² .............................................. B29F 3/00
[52] U.S. Cl. ................................... 425/144; 210/391;
366/87; 425/154; 425/183; 425/185; 425/192 R; 425/376 R
[58] Field of Search ............... 425/182, 183, 185, 186, 425/188, 190, 191, 192, 197, 198, 199, 376 R, 151, 154, 144; 210/232, 236, 297, 315, 433 R, 391, 445, 489, 498, 499; 209/379; 259/193; 137/329

[56] References Cited

U.S. PATENT DOCUMENTS

| 856,832 | 6/1907 | Anderson .......................... 210/489 X |
| 1,595,470 | 8/1926 | Johnson ............................. 425/197 X |
| 2,895,167 | 7/1959 | Paggi .................................. 425/197 |
| 3,402,427 | 8/1968 | Christofas et al. .................... 425/113 |
| 3,455,357 | 7/1969 | Zink .................................... 425/197 |
| 3,669,166 | 6/1972 | Colin .................................. 425/376 |
| 3,797,982 | 3/1974 | Borrello ............................... 425/198 |
| 3,856,683 | 12/1974 | Parr .................................... 210/489 X |
| 3,900,399 | 8/1975 | Kreyenborg et al. ................ 210/236 |

FOREIGN PATENT DOCUMENTS 610,597   10/1948   United Kingdom ................. 425/197

Primary Examiner—Francis S. Husar
Assistant Examiner—Mark Rosenbaum
Attorney, Agent, or Firm—Lewis B. Sternfels

[57] ABSTRACT

A housing has a threaded bore opening to an inlet and an outlet. The outlet axis is substantially perpendicular to the bore axis while the inlet axis is off-center from the bore axis. A plug in the housing bore comprises three cylindrical portions which are threaded in the housing bore and which are joined together but spaced apart by perforate cylindrical support tubes of lesser diameter than the threaded portions. A screen mesh extends about each support tube. Bores extend radially through two of the threaded cylindrical portions and only one at a time is alignable with the housing outlet, depending upon the threaded position of the plug in the housing bore. Accordingly, molten plastic material enters into the bore from the off-center housing inlet which urges the plastic material around the exterior of the screen to limit clogging and to extend screening life. Flow continues through the screen, the radial openings in the support tube, the bore in the threaded cylindrical portion of the plug, and the housing outlet. Back-pressure of the fluid material is adjustable by rotating the plug and its outlet bore with respect to the housing outlet to vary the opening size therebetween. Accidental complete lack of communication between the cylindrical portion bore and the housing outlet and any resulting excessive fluid back-pressure damaging to the extruder is prevented by an annular groove in the threaded cylindrical portion which permits material leakage out of the housing.

19 Claims, 5 Drawing Figures

SCREEN CHANGER APPARATUS

BACKGROUND OF THE INVENTION

1. Field of the Invention

The present invention relates to a screen changer assembly for screening out particulate matter in a flow of fluid and for regulating the back-pressure of the fluid. Although having general application, the present invention is more specifically directed for use with extruders of plastic material and the milling or back pressure on the material coming out of the extruder or other pump.

2. Description of the Prior Art

Screen changers for extruders coventionally comprise a pair of flat screens which are supported in the path of flow of fluid plastic material from an extruder screw substantially immediately prior to its extrusion into a definable shape. Such screens are required in order to filter out any solid particulate matter resulting from either unmelted plastic material or foreign solid objects accidentally mixed with the plastic material. Because such screens eventually become clogged with such foreign particulate matter, they must be changed and, accordingly, it is conventional to place two flat screens in tandem in a single support, so that one screen may be moved out of its screening position and be changed while the other can perform the screening operation. In such a manner, it is possible to avoid substantially shut-down in the operation of the extruder.

Such screens become clogged fairly frequently and must be replaced at frequent intervals. Therefore it has been suggested that a ribbon of filter ribbon be placed in a cassette holding a reel of screen. The screen is moved across the flow of plastics and fresh screen enters as the spent filter screen brings the impurities out of the machine. It has been further suggested to utilize a stationary spool, a transfer housing, and two filter cylinders. The spool, positioned between the extruder or other feed source and the subsequent equipment (die, spinning beam manifold, pelletizer, etc.), contains inlet and outlet passages to two filter assemblies. The filters may be sintered powder stainless tubes, sintered stainless pleated felt, or pleated stainless screens. The transfer housing, indexed around the spool, swings the filters on or off-stream. When one set of spool ports is on stream, permitting flow to and from one of the filter assemblies, the other spool ports leading to the second filter assembly are shut off from the flow. At predetermined pressures, the transfer housing shifts the filters to new positions. At the initial positions, filling and air purging commences for the new filter, which is still shut off from the outlet flow. Subsequently, however, when both filters are at equal pressures, the spent element is shut off and the new filter is placed fully on stream. The filter shift-over is now complete with a homogeneous and uninterrupted flow. The spent filter can be removed, cleaned, and readied for subsequent use.

Such prior art devices have several disadvantages. Flat screens are limited in the size of their coverage in the path of fluid flow and, therefore, require relatively frequent changing and cleaning. They further must be mounted securely in their supports against the pressure of the flowing plastic material. Furthermore, these flat screens, as well as the above-mentioned filter cylinder apparatus, tend to push solid particulate matter into the screen mesh, thereby increasing blockage of the screen. Flow rates, back pressure and temperature adjustments of the plastic material must be accomplished by accessory equipment. Another disadvantage is the relatively high cost of equipment and attention required in the servicing of such apparatus.

SUMMARY OF THE INVENTION

The present invention overcomes and avoids these and other problems with a relatively simple apparatus comprising a housing supporting a tubular screen placed about a support. The support has radial openings therein with the incoming fluid material being off-center from the screening chamber to impart a rotational flow to the fluid material within that chamber. This rotational flow configuration presents an increased area of available screen to collect debris than previously obtainable by prior art apparatus of comparable size and also tends to push large solid particulate matter around the exterior surface of the screen so as to inbibit clogging of the screen mesh. The fluid material then flows into the interior of the support tube and out of the support tube interior through an outlet opening in the housing supporting the tube. The tube is rotational with respect to the housing; therefore, the opening between the tube outlet and the housing outlet can be varied so as to provide for a valving operation in order to adjust the back pressure of the fluid material and the pump or extruder therefor. Preferably, a pair of tubes are utilized, each with screen material therearound in order to permit one of the support tubes and its screens to perform their operation, while the other of the support tubes and its screen is outside of the housing to permit change of the screen. Temperature sensors and controls are placed directly in the housing.

It is, therefore, an object of the present invention to provide for an improved screen-changing mechanism.

Another object is to provide for increased screening capacity of such a mechanism, compared to other styles of screen changers.

Another object is to provide for increased screening capacity of such a mechanism, compared to other styles of screen changes. Another object is to provide for avoiding large particle clogging of screens in such mechanisms.

Another object is to provide for self-contained adjustment of milling or back pressure and temperature of material in and from an extruder.

Another object is to provide for such a mechanism which is simple and economical.

Another object is to provide for safety pressure relief in such a mechanism from operator error.

Another object is to provide for simplicity of the changing operation in such a mechanism.

Another object is to provide for sealing of such a mechanism from undesired flow of fluid regardless of its viscosity.

Other aims and objects as well as a more complete understanding of the present invention will appear from the following explanation of an exemplary embodiment and the accompanying drawings thereof.

DESCRIPTION OF THE PREFERRED EMBODIMENT

Figure 1:
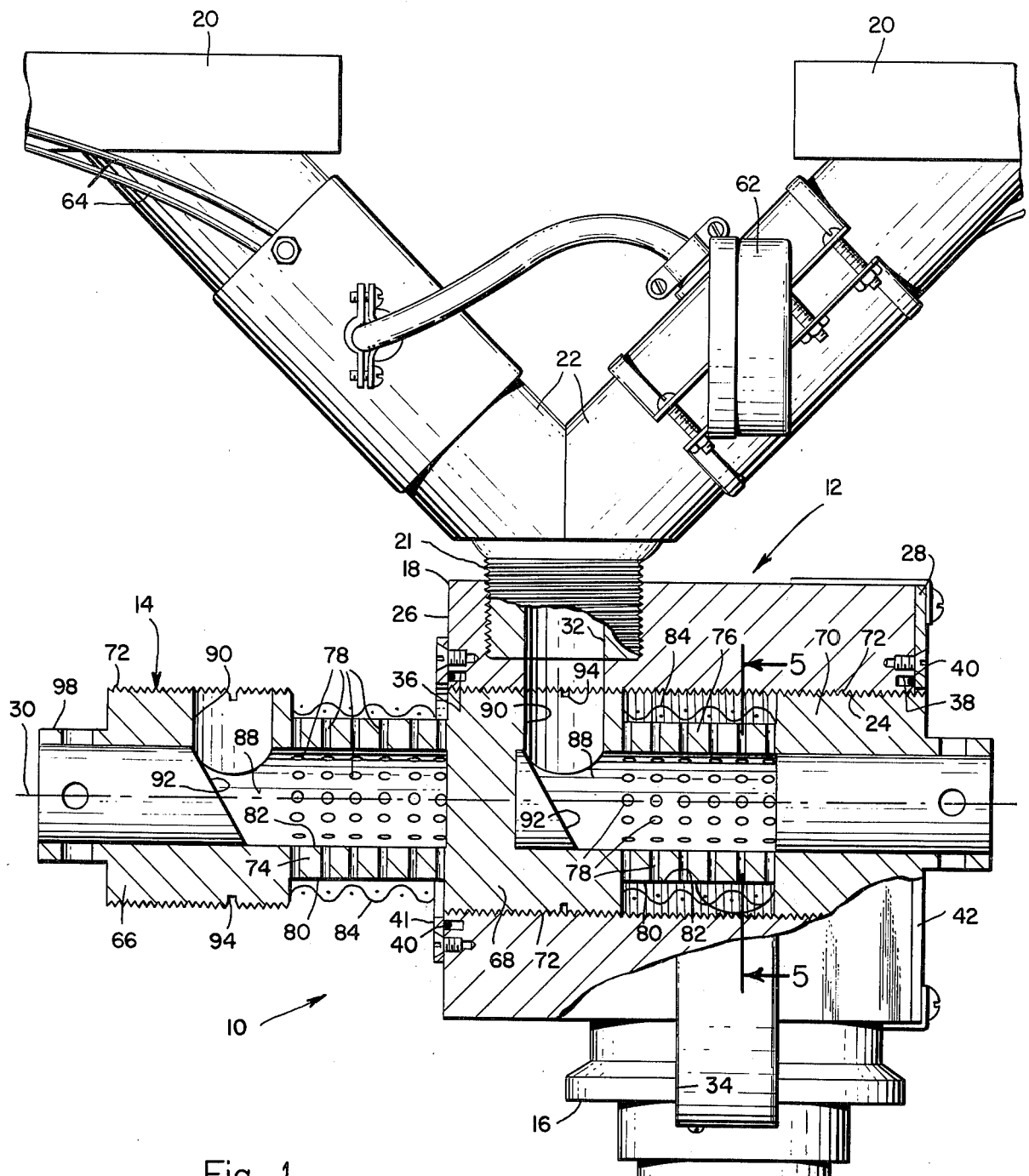
FIG. 1 is a view in partial section of the changer mechanism of the present invention illustratively connected to an extruder.

While the present invention has general usage, its preferred use is with an extruder of plastic material, such as for the manufacture of convoluted plastic hoses. In such extrusion of plastic material, the mechanism therefor comprises a hopper for insertion of raw material, including dyes and other additives such as lubricants, a heater for melting the raw material into a fluid, a screw for mixing and pumping or extruding the fluid material, and a die for shaping the fluid material into a definable shape. One important processing parameter in this operation relates to the milling or back pressure on the fluid material, which is the resistance of the fluid material against the screw. Increase of resistance of the fluid material results in an increase in the milling or back pressure in the screw. As the milling pressure increases, the fluid material in the screw has a tendency to move backward upon itself against the turning action of the screw, with the result of enhanced mixing. Such enhanced mixing is desired to provide more homogeneity in the material and in the plastic article being shaped by the extruder die as it passes therefrom. The present invention is specifically directed to improved control of the milling pressure, as well as to improved screening of the plastic material.

Accordingly, with reference to FIGS. 1-5, a screen changer assembly 10 comprises a housing block 12 and a plug 14. Housing block 12 is secured at its inlet end 16 to a source of fluid material, such as of molten plastic. At its outlet end 18, the housing block is connected to extruder dies contained within a housing 20 by a manifold adapter 21 and appropriate conduits 22. Although two outlets terminating in housings 20 are shown, it is to be understood that one, or more than two, housings and extruder dies may be used, as desired.

Figure 3:
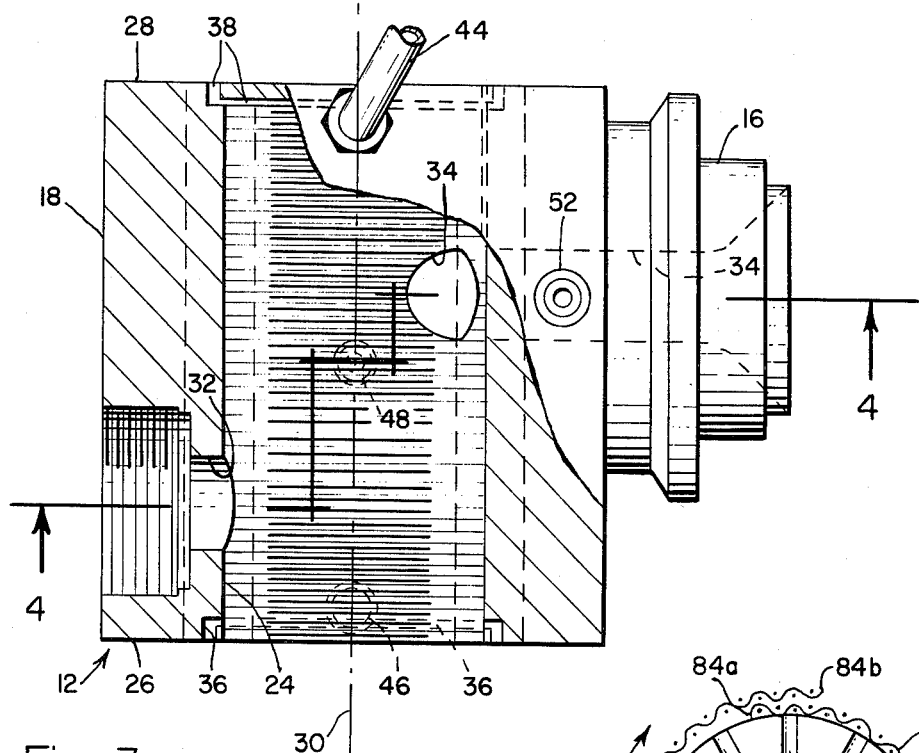
FIG. 3 is a view in partial cross section of the housing of the mechanism depicted in FIG. 1.
Figure 4:
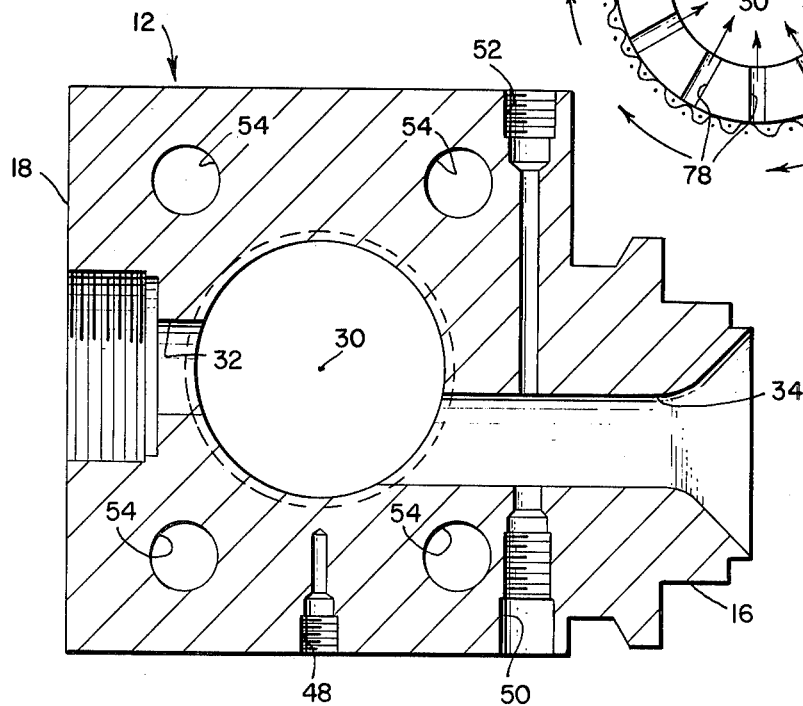
FIG. 4 is a view taken along lines 4—4 of FIG. 3.

Housing block 12 is provided with a threaded internal bore 24 extending therethrough between housing ends 26 and 28. The housing is provided with an axis 30 which also coincides with the axis of plug 14; therefore, indicium 30 will refer to both the housing and plug axes. Housing 12 is provided with an outlet 32 at its outlet end 18 whose axis is substantially perpendicular to and intersects with axis 30. An inlet 34 is provided in housing inlet end 16 also for communication with bore 24. As best shown in FIGS. 3 and 4, the axis of inlet 34 lies perpendicular to a plane passing through axis 30 but is off-centered therefrom so that fluid flowing into bore 24 will be provided with a rotational flow pattern for purposes to be more fully explained hereinafter. Bore 34, as shown in FIGS. 1 and 3, is further offset along axis 30 from outlet 32.

A pair of annular grooves 36 and 38 are respectively placed in housing ends 26 and 28 about bore 24 and are closed by sealing O-rings 40 and plates 42 secured to the housing in any suitable manner to provide annular conduits having inlets 44 and outlets 46. Closed annular grooves 36 and 38 are adapted to be supplied with a coolant flowing from inlets 44 out of outlets 46 in the event that the plastic material flowing through housing 12 is of insufficient viscosity as to creep along the threaded engagement between the housing and plug 14. The coolant is adapted to make the plastic material more viscous at housing ends 26 and 28, thereby reducing or even stopping leakage. It is to be understood, of course, that if the viscosity of the plastic material is sufficiently high, it may not be necessary to utilize this cooling adjunct.

Figure 2:
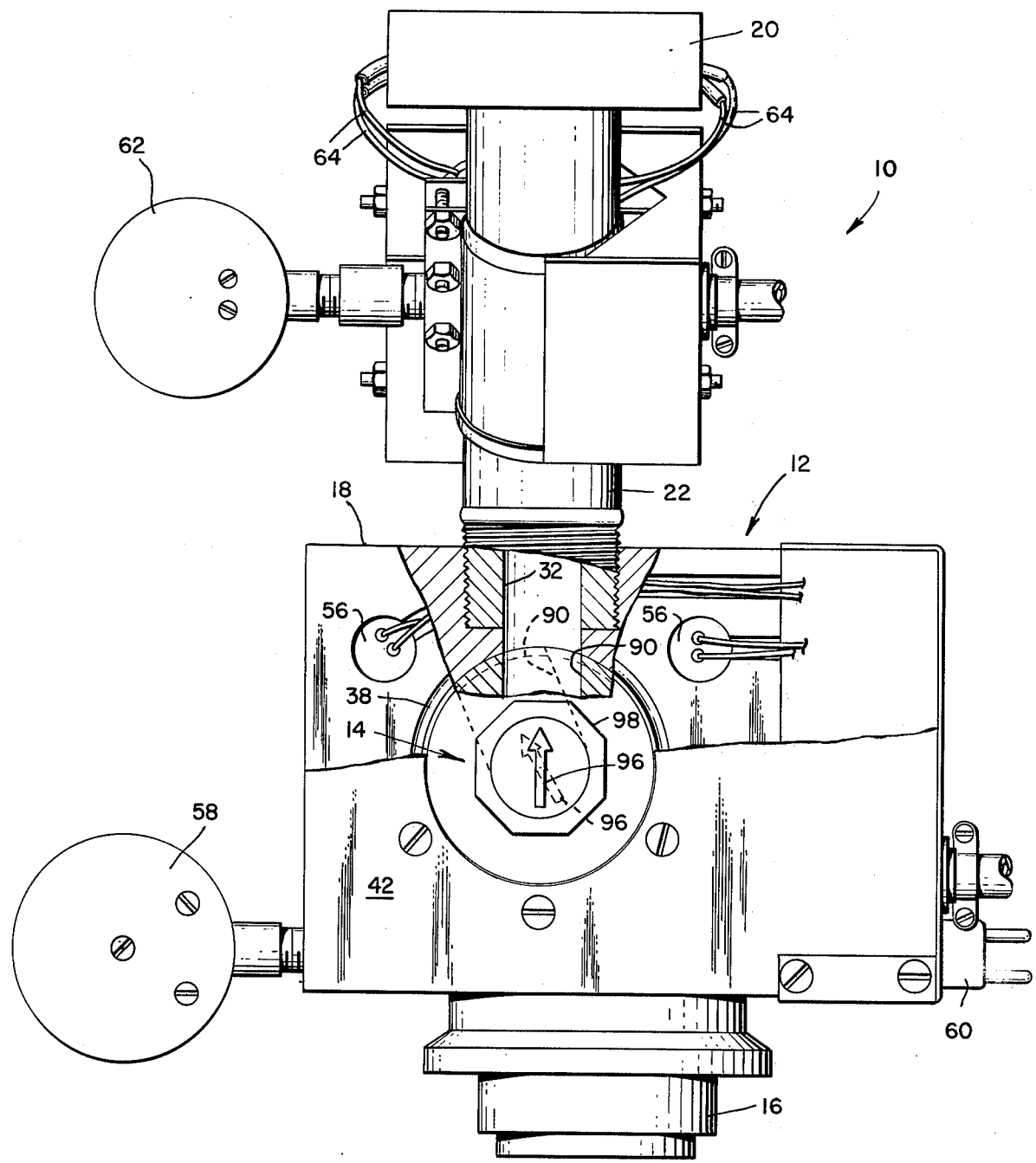
FIG. 2 is an end view of the apparatus depicted in FIG. 1.

As best shown in FIG. 4, housing 12 is provided with openings 48, 50, 52, and 54 for placement therein of temperature and pressure sensing devices and heating elements. The temperature is sensed at opening 48, the temperature of the plastic material is detected at inlet 34 through opening 50, and pressure of the fluid in inlet 34 is sensed through opening 52. Housing 12 is heated through openings 54. As best shown in FIG. 2, the various sensing elements include heaters 56, pressure gauge 58, and a thermocouple 60 inserted into their respective openings of housing 12. It is, in part, because of the construction of the present invention that these various sensing devices can be placed as close to where the temperature and pressure characteristics must be taken, as distinguished from the prior art, which is not usually adapted to such ease of sensing. Thus, by means of the thermocouples in openings 48 and 50, an immediate reading of the condition of the housing and, in particular, of the temperature and viscosity of the fluid material may be obtained and controlled almost instantaneously and close to the extruder dies and die housing 20 for precise adjustment and control of the defined shape of the article to be extruded. In conjunction with precise definition of the article to be extruded, the pressure of the material can be adjusted by viewing pressure gauge 58 extending from opening 52, by cooperation between the plug and the housing, to be described shortly hereinafter. Pressure and temperature parameters may also be determined and controlled at die housing 20 by a pressure gauge 62, heaters in housings 20 controlled by wires 64, and other devices, as needed.

Figure 5:
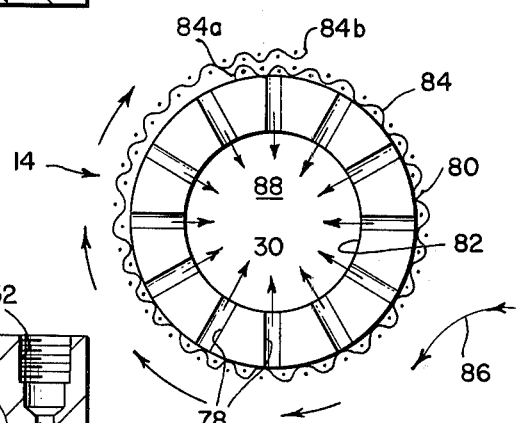
FIG. 5 is a view taken generally along the lines 5—5 of FIG. 1.

Referring back to FIG. 1, plug 14 preferably comprises three cylindrical portions 66, 68, and 70, each having threaded external surfaces 72 which are adapted for threaded engagement with threaded internal bore 24 of the housing. Cylindrical portions 66 and 68 are joined by a cylindrical tube support 74 while cylindrical portion 68 and 70 are joined by a second support tube 76. Both support tubes 74 and 76 have radially directed openings 78 therein extending from their outer surfaces 80 to their inner surfaces 82, the latter providing for an internal flow path 88 for the plastic material. Disposed about outer surfaces 80 are screens 84, which may comprise one or more screens of different meshes, for example, a coarse screen on each of surfaces 80 with a fine screen above the coarse screen, clipped together. Preferably, screens 84 are of rectangular configuration and, as shown in FIG. 5, are wrapped so that each leading edge 84a is disposed beneath the trailing edge 84b so that flow of material, as represented by arrows 86, will not lift the exposed edge of the screen but, rather, hold the screen in place without permitting liquid to flow within instead of through the screens.

Internal cavity 88 extends into cylindrical portions 66 and 68, and a radial bore 90 extends therefrom through threaded external surfaces 72. Cylindrical portion 70 has no interior cavity or bore but is used primarily as a further support for the plug and a closure for one of the cavities 88. An inclined surface 92 is provided as a diverter of plastic material for aiding its movement into and through bore 90.

Annular grooves 94 are formed within and extend completely about threaded external surfaces 72 of cylindrical portions 66 and 68 and communicate with radial bores 90 for effecting a pressure relief and slow flow and escape of fluid material, should radial bore 90 not otherwise be in communication with housing outlet 32. Specifically, if bore 90 were not at all aligned with outlet 32, as distinguished from the representations shown in FIGS. 1 and 2, fluid flow would follow the path provided by inlet 34, screen 84, openings 78, internal cavity 88, bore 90, annular groove 94, and outlet 32. Without the flow path provided by annular groove 94, during complete non-communication between bore 90 and outlet 32, plastic flow would be completely stopped and the resulting increase in back pressure could damage the extruder or other parts. Thus, annular grooves 94 prevent possible damage to the equipment secured to inlet end 16 from excessive back pressures.

As shown in FIG. 2, an arrow 96 is milled or otherwise formed on octagonal end 98 of plug 14 and points in the direction of exit holes or bores 90 so that an operator may visually obtain an indication of approximate alignment of bore 90 with housing outlet 32.

In operation, let it be assumed that plug 14 is engaged with housing 12 as shown in FIG. 1 so that plastic material flows through inlet 34, rotationally around screen 84, as shown in FIG. 5, through the screen and openings 78 and into internal cavity 88 of support tube 76 positioned between cylindrical portions 68 and 70. The plastic material then flows against diverting inclined surface 92 and through radial bore 90 and outlet 32 to the extruder dies. In the event that the pressure of the material must be changed, as noted by pressure gauges 58 and 62, one need only to rotate plug 14 slightly by placing a wrench on its octagonal and 98 in order to vary the coincidence of the opening of bore 90 with respect to the opening of outlet 32, the precise pressure changes also being noted on gauges 58 and 62.

Let it be assumed further that screen 84 between cylindrical portions 68 and 70 has become sufficiently clogged with particulate matter so as to require change in screens. It is only necessary, then, to rotate plug 14 by means of octagonal end 98 to screw plug through the housing so that screen 84 on tube support 74 between cylindrical portions 66 and 68 will now be within the housing and the screen between portions 68 and 70 will be outside of the housing at the right as viewed in FIG. 1. The pressure through bore 90 of cylindrical portion 66 is then adjusted by minute rotational movements of the plug. It is generally preferable to leave the plastic and the clogged first screen on the plug and utilize the screen changer until the alternate screen becomes dirty. Then, when it is necessary to change the alternate screen, the formerly dirty screen is removed and a clean screen is installed, in order to prevent the plastic in the holes to the screening chamber from oxidizing.

Although the invention has been described with reference to a particular embodiment thereof, it should be realized that various changes and modifications may be made therein without departing from the spirit and scope of the invention.

I claim:

1. A screen changer assembly for improved screening out of particulate matter in a flow of fluid comprising:
   a screen having a mesh size sufficient for preventing the particulate matter from passing therethrough and configured substantially as a closed tube generally disposed on an axis;
   a support of generally tubular shape supporting said screen and comprising means defining an interior flow path, and said support having a perforate wall enclosing said interior flow path means; and
   means urging the flow of the fluid in a generally unidirectional rotational direction around the exterior of said screen and thence through said screen, said perforate wall, and said interior flow path means, while the particulate matter is screened out, said urging means thereby moving the particulate matter around the screen exterior.

2. A screen changer assembly for screening out particulate matter in a flow of fluid comprising:
   a support of generally tubular shape comprising means defining an interior fluid flow path and a perforate wall enclosing said interior flow path means;
   a screen having a mesh size sufficient for preventing the particulate matter from passing therethrough and configured substantially as a closed tube and surrounding said support and supported on its exterior surface thereby for permitting the flow of the fluid through said screen, said perforate wall means and said interior flow path means, while screening out the particulate matter; and
   means directing the flow of the fluid with generally unidirectional rotation about said screen for minimizing clogging of said screen.

3. A screen changer assembly as in claim 2 wherein said screen comprises a filter sheet wrapped about said perforate support wall means with edges of said sheet overlapping, the outermost edge of said sheet edges extending in the direction of the rotation for avoiding flow of the fluid under said outermost edge.

4. A screen changer assembly for use in an extruding apparatus of fluid plastic material having an extruder and a die, comprising:
   a housing having an inlet and an outlet for providing a path of flow of the fluid plastic material;
   means defining a screen and support therefor in said housing and in the path of flow of the fluid plastic material for screening out any particulate material therein of predetermined size; and
   means in and cooperable with said support means and at least one of said inlet and said outlet of said housing for exerting a milling pressure of the fluid plastic material in the extruder.

5. A screen changer assembly as in claim 4 further including means in said support means and cooperable with said milling pressure means for relieving pressure of the fluid plastic material and for protecting the extruder from excessive back pressures of the fluid plastic material tending to damage the extruding apparatus.

6. A screen changer assembly as in claim 4 wherein said milling pressure means includes a valve for restricting the flow of the fluid plastic material.

7. A screen changer assembly as in claim 6 wherein said valve includes means defining an orifice in said support means movable with respect to means defining an orifice at one of said housing inlet and outlet.

8. A screen changer assembly as in claim 7 further including means defining a slot of smaller dimensions than said orifice means in both said support means and said housing and in continuous communications with both said orifice means for providing a continuous small flow of fluid plastic material and a pressure relief therefor, thereby for preventing excessive and potentially destruction back pressures from being exerted on the extruder.

9. A screen changer as in claim 4 further including means coupled to said milling pressure means for changing and adjusting the milling pressure.

10. A screen changer assembly for screening out particulate matter in a flow of fluid comprising:
  a screen having a mesh size sufficient for preventing the particulate matter from passing therethrough and configured substantially as a closed cylindrical tube;
  a support of substantially cylindrical shape coaxially centered with said screen on an axis and supporting said screen, said support comprising means defining an interior flow path, a wall enclosing said interior flow path means, and means extending through said wall defining a plurality of openings, thereby for permitting the flow of the fluid through said screen, said openings means and said interior flow path means, while screening out the particulate matter;
  a housing surrounding and supporting said support and said screen; and
  means defining an inlet in said housing positioned adjacent to said screen and said support and offset from the axis for directing the flow in a generally unidirectional rotational flow pattern about and over the exterior surface of said screen, thereby for enabling screening of the fluid through the entire cylindrical surface of said screen and for flowing of the fluid through said openings means in said support wall, while continuously moving the particulate material about the exterior surface of said screen for minimizing clogging thereof by the particulate material.

11. A screen changer assembly as in claim 10 2 wherein said screen comprises a rectangular sheet wrapped about said support wall with edges of said sheet overlapping in a manner for preventing lifting of one of said sheet edges during the rotational flowing of the fluid.

12. A screen changer assembly as in claim 10 further including means defining an outlet in said housing having an axis substantially perpendicular to and intersecting the axis of said support, means in said support defining an opening alignable with said housing outlet means and coupling said interior flow path means with said housing outlet means, and means rotating said support in said housing for varying the alignment of said opening means with respect to said housing outlet means, thereby for regulating the back pressure of the fluid from said housing inlet means and through said housing inlet means from flow conditions of substantially no-flow to full-flow.

13. A screen changer assembly as in claim 12 further including means defining an annular groove in said support at said support opening means for permitting small flow of the fluid during the no-flow condition, thereby for acting as a fluid pressure relief and for preventing excessive fluid back-pressures.

14. A screen changer assembly as in claim 12 further including an indicator on said support rotatable therewith for indicating the alignment of said opening means with respect to said housing outlet means.

15. A screen changer assembly as in claim 14 further including:
  a second substantially circular screen having a mesh size sufficient for preventing the particulate matter from passing therethrough and configured substantially as a closed tube;
  a second substantially circular support of generally tubular shape integrally secured in tandem with said first-mentioned support and rotatable therewith for supporting said second screen and having means defining a second interior flow path, a second wall enclosing said second interior flow path means and second means extending through said second wall defining a plurality of second openings, thereby for permitting an alternate flow of the fluid from said housing inlet means, through said second screen, said second opening means and said second interior flow path means, and out of said housing outlet means while screening out the particulate matter and while continuously moving the particulate material about the exterior surface of said second screen for minimizing clogging thereof by the particulate material;
  said first and second supports having an axial length greater than that of said housing so that, when one of said first and second supports are entirely within said housing, at least the other of said first and second supports and said screen thereon are outside said housing; and
  means in said housing cooperable with both said first and second supports enabling alternate communication of only said one of said first and second supports and screens with said housing inlet and outlet means upon rotation of said first and second supports by said support rotating means, said support rotating means thereby enabling said other of said first and second supports and screens to be moved outside of said housing for removing, cleaning, and replacing of the other of said first and second screens and the particulate matter thereon.

16. A screen changer assembly as in claim 12 for use with an extruder of said fluid, in which said fluid comprises plastic material, further, including heating means coupled to said housing inlet means for melting said plastic material extruding means coupled to said housing outlet means for extruding said plastic material into a definable shape, and means in said housing positioned axially outwardly of said housing inlet and outlet means supporting said support and including viscosity increasing means for increasing the viscosity of any of said plastic material at said supporting means of said housing for inhibiting flow of said plastic material outside of said housing otherwise from said housing outlet means.

17. A screen changer as in claim 10 further including means in and coupled to said housing for sensing and controlling temperatures and pressures therein. s 18. A screen changer assembly for use with and coupled to an extruder for screening out particulate matter in a flow of plastic material, including:
  at least two screens each having a mesh size sufficient for preventing the particulate matter from passing therethrough and configured substantially as a closed tube;
  a housing having means therethrough defining a threaded cylindrical bore having an axis, and means defining an inlet to and on outlet from said bore means for flow of said plastic material through said housing, said inlet means having an axis offset from intersecting with the bore axis for imparting a generally unidirectional rotational flow of said plastic material into and around said housing bore means, and said outlet means being spaced from said inlet means along the bore axis of said housing;
  a plug having an axis coaxial with the bore axis of said housing and comprising at least three cylindrical portions having threaded external surfaces for engaging said threaded cylindrical bore means of said housing and for enabling rotation and axial movement of said plug in said housing, said cylindrical portions being spaced from one another with adjacent ones thereof integrally joined together respectively by perforate tubes of lesser diameter than that of said cylindrical portions, said perforate tubes each having an interior flow path and a generally tubular shape for supporting each of said screens; and all of said cylindrical portions but one each having
means therein defining an interior cavity having a closed inclined end and coupled with and forming an extension of said interior flow path means of said perforate tube, means defining a bore extending at an angular inclination to the plug axis in communication with said interior cavity means at said closed inclined end and through said threaded external surface for enabling communication with said housing outlet means, and means defining an annular groove formed in said threaded external surface and communicating with said bore means for providing a pressure relief for said plastic material when said bore means is not in communication with said housing outlet means;

19. A screen changer as in claim 18 further including plug rotating means operatively associated with said plug for rotating said plug in said housing for placing only one of said support means and said bore means of said cylindrical portions in respective communication with said housing inlet and outlet means, thereby for varying the communication of said bore means with said housing outlet means for regulating the back pressure of said plastic material and for permitting change of said screens on the others of said support means outside of said bore means of said housing.

* * * * *